Nov. 30, 1937.  W. M. BRADSHAW  2,100,731
POLYPHASE METER CASING
Filed Sept. 19, 1936

WITNESSES:

INVENTOR
William M. Bradshaw.
BY
ATTORNEY

Patented Nov. 30, 1937

2,100,731

UNITED STATES PATENT OFFICE 2,100,731

POLYPHASE METER CASING

William M. Bradshaw, Summit, N. J., assignor to Westinghouse Electric & Manufacturing Company, East Pittsburgh, Pa., a corporation of Pennsylvania Application September 19, 1936, Serial No. 101,571

4 Claims. (Cl. 171—34)

The present invention relates to watthour meters of the detachable type and more particularly to an improved contact arrangement for detachable polyphase watthour meters.

The detachable meter is of the type in which an encased watthour meter element has contact blades projecting from the base of the casing for cooperation with contact jaws mounted in a receptacle or on a support for completing the circuit to the meter element. This construction is shown somewhat in detail in Patent 1,969,499 to Bradshaw et al. issued August 7, 1934. As shown in this patent, the meter is of the single element type requiring four contact blades and cooperating jaws, two of which are connected to the line side of the circuit and the remaining two are connected to the load circuit.

In adapting this general metering theory to polyphase elements, and particularly when it is desired to mount a two-element meter in a casing substantially the same size as used for single phase, the arrangement of contact blades on the base of the meter presents some difficulty. The receptacle upon which the meter is mounted usually is provided with diametrically opposed nipples or threaded openings for receiving the wiring conduit. The conduit, however, may extend either vertically or horizontally so that the receptacle may assume either of two positions at 90° from each other. In the single phase meter, referring to the aforesaid Patent 1,969,499, if the receptacle 1 is rotated 90° from the position shown in Fig. 1, the contact sockets or jaws 2 must be individually rotated 90° so that the meter may be mounted in its proper upright position. The rotatability of the contact sockets may be accomplished as shown in Patent 2,066,300, issued December 29, 1936 to W. G. Mylius.

In the case of a two-element meter, however, a fifth contact blade is required for the common connection to the two potential coils. This destroys the symmetry of arrangement of the usual four blades and makes it difficult to rotate the base receptacle 90° to take care of horizontal and vertical conduit systems.

Accordingly, it is an object of the present invention to provide an arrangement of contact blades for a two-element detachable meter in a manner to minimize the expense of the meter construction and avoid the necessity for stocking two styles of meters to take care of vertical and horizontal conduit systems.

Figure 1:
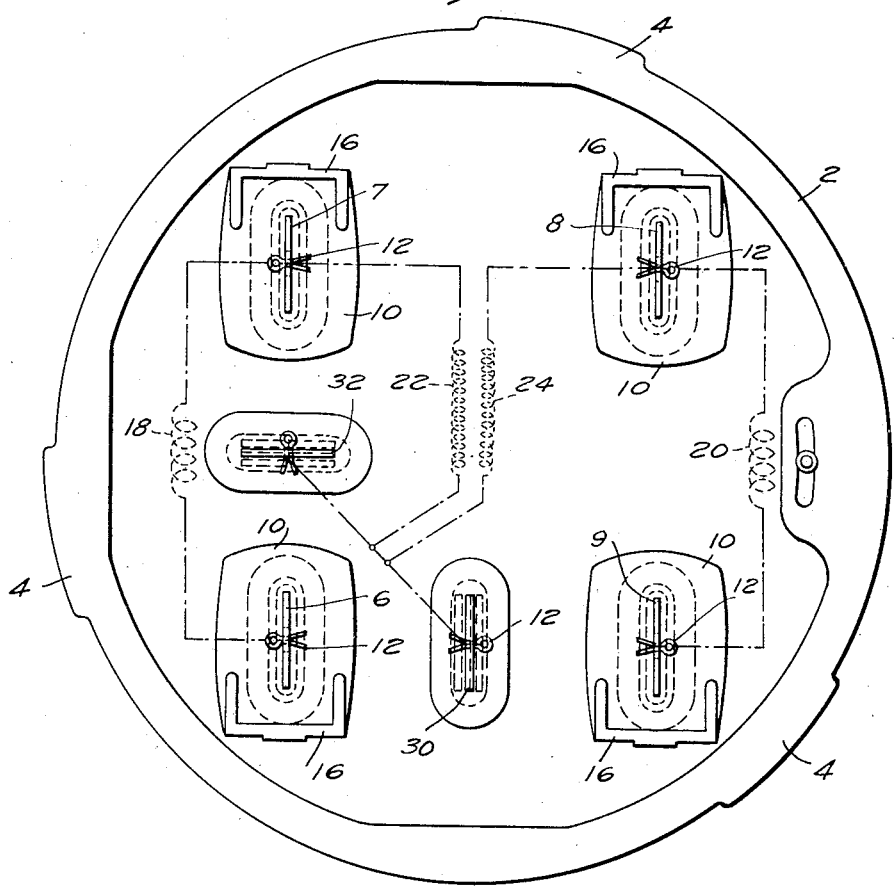
Figure 2:
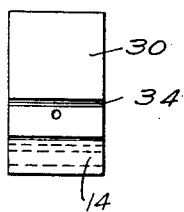
Figure 3:
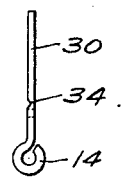

Other objects of the invention will be apparent from the following specification read in conjunction with the accompanying drawing, wherein:

Figure 1 is the bottom view of a two-element meter of the detachable type showing the contact blade arrangement, Fig. 2 is a view in elevation of one of the contact blades, and Fig. 3 is a view in end elevation of the blade shown in Fig. 2.

In the drawing, the construction of the entire meter is omitted in the interest of brevity. However, this type of meter is fully shown and described in my copending application, Serial No. 46,513, filed October 24, 1935. The arrangement of the contact blades in the present invention, however, differ from that shown in the pending application.

Referring more particularly to Fig. 1, the base 2 of the watthour meter is substantially circular and is provided with their peripheral lugs 4 to which the cover of the meter is to be secured. As in the case of a single phase meter, four contact blades 6, 7, 8 and 9, the centers of which define a square, project from the base 2 and are secured thereto by means of an insulating block 10 which slips over the blade and is retained in position by a cotter pin 12; the blade having an enlarged head portion 14 on the side of the base opposite to that shown in Fig. 1. In accordance with the usual practice, of course, the enlarged head portion 14, as well as the body of the plate, is insulated from the metallic base 2 and the block 10 is provided with a portion 16 extending parallel with the blade to form an insulating barrier so that the blades will not engage the sides of the base receptacle when placed in position. The foregoing is descriptive of present general practice, and it is believed that a more detailed description is unnecessary.

As indicated in Fig. 1, the current coil 18 of one element is connected between blades 6 and 7 within the meter and the current coil 20 for the other element is connected between the blades 8 and 9. The potential winding 22, of the element having current coil 18, is connected at one end to the blade 7, and the other potential winding 24 has one end connected to the blade 8. The other ends of the potential windings are connected to a common contact blade, as hereinafter set forth.

In the case of a vertically extending conduit system, or a receptacle in which the contact jaws extend vertically to receive the blades shown in Fig. 1, a fifth contact blade 30 similar in construction to the usual four blades, may be disposed in the position shown for cooperation with a correspondingly positioned jaw in the receptacle or on the supporting structure. The blade 30 may be secured to the base in the same manner as the blades 6 through 9 but the vertically extending barrier 16 may be omitted, because the other barriers effectively prevent the blade 30 from contacting the supporting structure or receptacle.

However, if the meter is to be associated with a receptacle connected in a horizontally extending conduit system, necessitating a 90° rotation of the receptacle, the blade 30 would no longer be in proper position to engage the extra contact jaw in the receptacle. Accordingly, a second auxiliary potential blade 32 is provided between the blades 6 and 7 and facing at right angles thereto. Obviously, this blade will be in proper position to engage the potential jaw in the receptacle when the receptacle is rotated 90° from the position it would assume to receive the blades 6 through 9 as shown in Fig. 1. As in the case of the single phase meter, the jaws for the blades 6 through 9 are each rotated 90° to be in proper position to receive these blades when the receptacle is so rotated.

In many installations, however, the two blades 30 and 32 cannot both project from the base at the same time. That is, the one which does not engage the potential jaw in the base is unprotected and may be obstructive to wiring in the socket and may in fact actually engage portions of the socket structure.

In order to avoid this above difficulty, it is proposed that each of the blades 30 and 32 be provided with a weakened portion 34 so that the blade which is not required for the installation may readily be broken away, without removing the base of the blade and, accordingly, not destroying the dust proof character of the base.

In accordance with the invention, therefore, a contact blade assembly for a polyphase meter is provided which may be readily adapted for sockets connected into either a vertically or horizontally extending conduit system, and results in a single style of base construction avoiding the necessity of stocking two types of meter and the possibility of supplying the wrong type for a given installation.

Quite obviously other expedients than that shown may be resorted to without departing from the spirit of the invention, and no limitations should be placed on the invention except as imposed by the appended claims.

I claim as my invention:

1. In a meter of the type having a plurality of contacts projecting normal to the base thereof and secured to said base, the centers of said contacts being symmetrically disposed on said base; an auxiliary contact secured to and projecting from said base at a point between a pair of said plurality of contacts, means on said auxiliary contact to facilitate the breakage thereof adjacent to said base, and a second auxiliary contact between a different pair of said plurality of contacts and having means to facilitate its breakage adjacent to said base.

2. In a meter of the type having a plurality of contacts projecting normal to the base thereof and secured to said base, the centers of said contacts being symmetrically disposed on said base; an auxiliary contact secured to and projecting from said base at a point between a pair of said plurality of contacts, means on said auxiliary contact to facilitate the breakage thereof adjacent to said base, and a second auxiliary contact between a different pair of said plurality of contacts and having means to facilitate its breakage adjacent to said base, the centers of said plurality of contacts defining a rectangle with said auxiliary contacts in adjacent sides thereof.

3. In a meter of the type having four contact blades secured to and projecting from the base thereof, the longitudinal axes of which define a square and all of which face in the same direction; an auxiliary contact blade secured to said base between a pair of said four contact blades and facing parallel thereto, an additional auxiliary contact blade secured to said base between a different pair of said four contact blades facing at right angles thereto, and means on at least one of said auxiliary blades for facilitating breakage thereof at a point adjacent to said base.

4. In a meter of the type having four contact blades secured to and projecting from the base thereof, the longitudinal axes of which define a square and all of which face in the same direction; an auxiliary contact blade secured to said base between a pair of said four contact blades and facing parallel thereto, an additional auxiliary contact blade secured to said base between a different pair of said four contact blades facing at right angles thereto, said auxiliary contact blades being in adjacent sides of the square defined by said four blades, and means on both of said auxiliary blades for facilitating the breakage thereof adjacent to said base.

WILLIAM M. BRADSHAW.